(No Model.)

P. K. DEDERICK.
BALE AND PROCESS OF FORMING SAME.

No. 496,042. Patented Apr. 25, 1893.

Witnesses:
Harry S. Rohr.
Alex Stewart.

Inventor:
Peter K. Dederick,
By Church & Church
his Attorneys.

UNITED STATES PATENT OFFICE.

PETER K. DEDERICK, OF LOUDONVILLE, NEW YORK.

BALE AND PROCESS OF FORMING SAME.

SPECIFICATION forming part of Letters Patent No. 496,042, dated April 25, 1893.

Application filed October 11, 1892. Serial No. 448,538. (No model.)

*To all whom it may concern:*

Be it known that I, PETER K. DEDERICK, of Loudonville, in the county of Albany and State of New York, have invented a certain new and useful Bale and Process of Forming the Same; and I do hereby declare the following to be a full, clear, and exact description of the same, reference being had to the accompanying drawings, forming a part of this specification, and to the letters of reference marked thereon.

This invention relates to the art of baling and has for its object to provide an improved bale and process of forming the same, whereby certain advantages are secured as will be hereinafter pointed out.

Broadly stated, the invention consists, in a bale and process of forming a bale provided with a protecting covering held in place by having portions thereof clamped or pressed within the body of the bale.

It consists, secondly, in a sectional bale, by which is meant a bale built up of successive charges, and process of forming the same with a cover held in place by having portions thereof clamped between the sections or charges; and, finally, it consists in a bale of cut or fine material, such as cut hay, bran, saw dust, cotton hulls or grain, having a covering of longer material or fiber such as hay, straw, or similar substance, held in place by having portions thereof pressed within the body of the bale.

Figure 1:
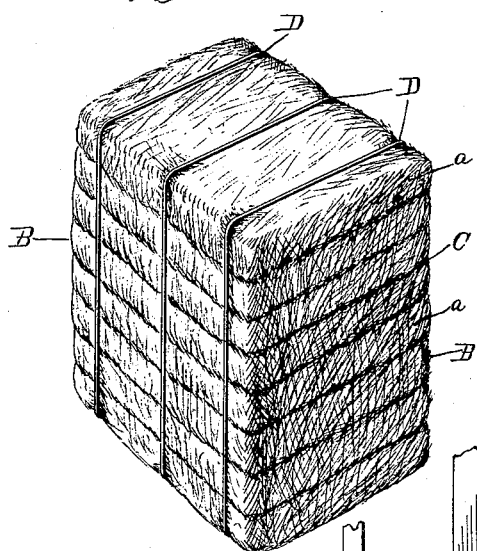
Figure 2:
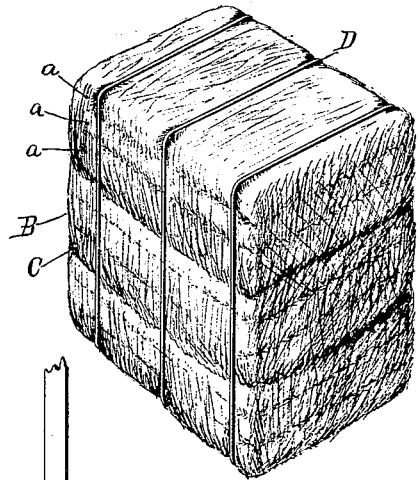
Figure 3:
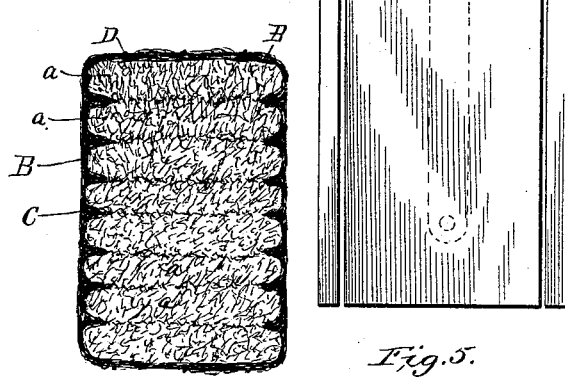
Figure 4:
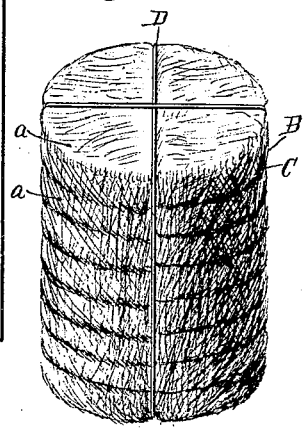
Figure 5:
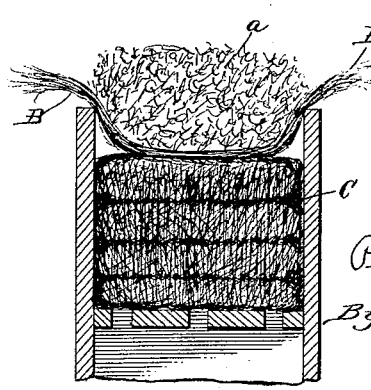

In the accompanying drawings: Figures 1 and 2 illustrate completed bales with a covering of hay or straw held in place as just pointed out. Fig. 3 is a sectional view of the preferred form of bale. Fig. 4 shows a cylindrical bale constructed in accordance with this invention. Fig. 5 is a view showing some of the steps in forming one of the bales.

Like letters of reference indicate the same parts in all the figures.

A bale constructed in accordance with this invention is built up of sections a, a, as is the ordinary bale, but it differs from the ordinary bale, in that a covering B is applied to the outside of it and held in place by having portions of the covering clamped between the sections as at C, the whole being held by bands D, applied after a suitable covering for the end has been placed in position.

In the preferred construction, the covering is formed by a light layer of long loose material, such as hay or straw, although the thickness or particular character of the cover is unimportant, as the gist of the invention does not reside in the use of any particular material. It may be found, in some instances, sufficient to employ separate fibers or stalks and again, in other instances, to employ a fabric depending upon the character of the material being baled and the handling which the bale will undergo tending to injure or loosen the baled material. The procedure adopted for the formation of a bale with such a covering, when a press chamber or receptacle is employed, is, to first arrange the cover in the chamber with portions around the sides, as shown in Fig. 5 for instance, secondly to insert the material to be baled, thirdly, to press the same down, then fold in the ends of the cover and arrange a new portion for the next charge, or, what is better, simply fold in a bight or fragment of the cover, as shown in Fig. 3, then insert and press down another charge or section, clamping the bight or fragment between the sections, which operations are continued until the bale is complete, when a covering piece is put in for the rear end and the bale is tied off, in the usual manner. Should the character of the material warrant, it may be preferable, under some circumstances, to only secure the covering at widely separated points, as shown in Fig. 2, where it is secured between every third section or charge. The bale may be round with the wires crossed, as in Fig. 5, which is perhaps one of the best forms or the corners of the oblong bale may be filled in to make them round and provide a thicker covering at these points.

Where it is desired to protect without entirely inclosing the bale only a sprinkling of long material or stems need be employed, which, pressed into and secured to the outside of the bale, form practically a net-work scarcely hiding it, yet protecting and securely holding it from the loss by wastage, resulting from handling, which uncovered bales are subject to.

It is obvious that any appropriate machinery may be employed to carry out the process set forth, hence herein I do not wish to be limited to any particular means; neither do I wish to be understood as limiting myself to any particular materials either in the body of the bale or covering employed, for bales of long material as hay and cotton may be covered and protected as well as bales of short material. The invention finds its principal application however in the baling of short material as before specified.

Having thus described my invention, what I claim as new is—

1. The process of baling described consisting, first, in preparing a cover for the reception of a bale; secondly, inserting a section of the bale in said cover; thirdly, folding bights or intermediate portions of the cover over the section; fourthly, inserting another section and confining the bight or intermediate portion of the cover between the sections and so on until the bale is of proper size and finally tying off or uniting the sections to complete the bale; substantially as described.

2. The process of baling described consisting, first, in placing a covering within a press box or receptacle, secondly, forcing a charge of material into said covering and receptacle, thirdly, folding a portion of said covering over the charge of material; fourthly, forcing another charge against the former and over the inwardly folded portions of the cover confining the same between the two charges and so on until the bale is completed; substantially as described.

3. As an improved article, a sectional bale of pressed material provided with a covering having bights or intermediate portions confined between the edges of the sections; substantially as described.

4. As an improved article, a compressed sectional bale of fine material as cut hay, cotton hulls, saw dust, bran, &c., having a covering of layers of stems of hay, straw or other longer material secured thereto by fragments or folds caught or pressed in between the sections and a binder for holding the bale compressed; substantially as described.

5. As an improved article, a bale of fine or short material provided with a covering of long unwoven fibers having portions thereof confined within the body of the bale and a binder or fastening passing around the bale to hold the same compressed; substantially as described.

PETER K. DEDERICK.

Witnesses:
F. X. CLEMENT,
R. J. VAN SCHOONHOVEN.